G. J. HICKS.
DOUGH PROOFING MACHINE.
APPLICATION FILED MAR. 4, 1918.
1,290,193.
Patented Jan. 7, 1919.
Fig. 1.
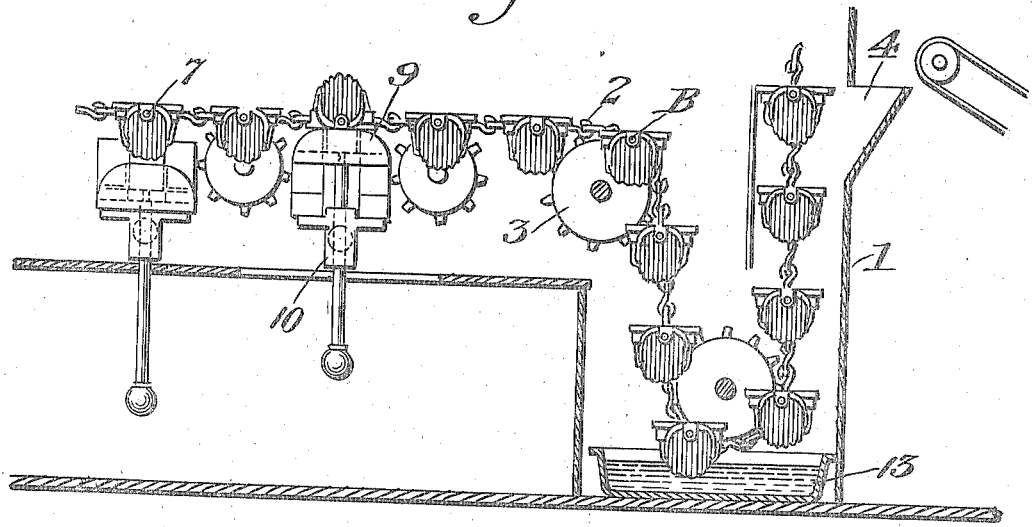
Fig. 2.
Fig. 4.
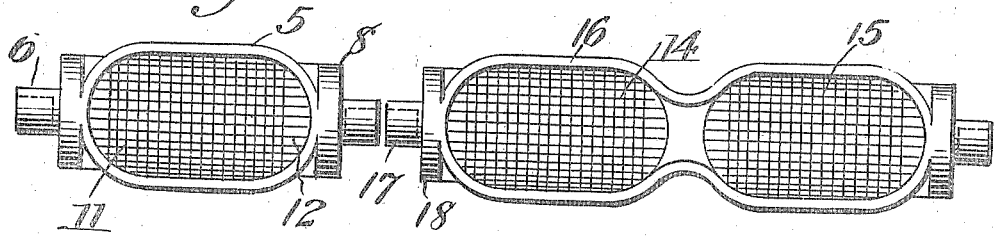
Fig. 3.
Fig. 5.
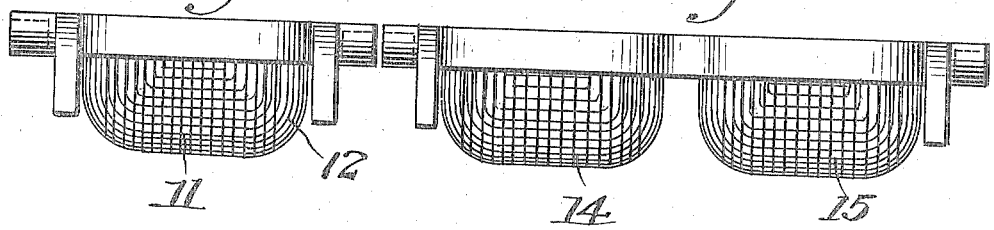
Inventor.
Geo. J. Hicks

UNITED STATES PATENT OFFICE

GEORGE J. HICKS, OF SAGINAW, MICHIGAN.

DOUGH-PROOFING MACHINE.

1,290,193. Specification of Letters Patent. Patented Jan. 7, 1919.

Application filed March 4, 1918. Serial No. 220,286.

*To all whom it may concern:*

Be it known that I, GEORGE J. HICKS, a citizen of the United States, and resident of Saginaw, in the county of Saginaw and State of Michigan, have invented certain new and useful Dough-Proofing Machines, of which the following is a specification.

This invention relates to dough proofing machines, and particularly to a proofer bucket and means for lubricating the same.

The primary object of the invention resides in the provision of a proofer bucket which will be sanitary, which will not require the application of flour dust to prevent the sticking of the dough, and from which the dough may be readily deposited after the proofing operation.

A further object of the invention resides in the combination of the particular proofer bucket with means for lubricating the same to facilitate the passage of the dough from the bucket.

With these and other objects in view, such as will appear as my description progresses, my invention comprises the combination and arrangement of parts as set forth in and falling within the scope of the appended claims.

In the drawing, wherein the preferred embodiments of my invention are illustrated:—

Figure 1 is a sectional view illustrating a proofing chamber in which a conveyer, including a plurality of buckets constructed in accordance with the present invention, operates, and illustrating further the relation of the buckets and the lubricant-applying means;

Fig. 2 is a plan view of a single bucket;

Fig. 3 is a side elevation thereof;

Fig. 4 is a plan view of a double bucket; and

Fig. 5 is a side elevation of the latter.

Referring to the drawing, a portion of a proofing chamber 1 is illustrated, in which chamber a conveyer, which includes spaced chains 2 operating over suitable sprockets 3 and including a plurality of buckets, indicated generally by the reference character B, is located. This conveyer is so located that the buckets successively pass an opening 4 in the chamber 1 through which the dough pieces are introduced to the buckets.

Each of the buckets illustrated in Fig. 1 includes, as disclosed in Figs. 2 and 3, a metallic frame 5 of the desired form. Formed on and extending from the ends of this frame are trunnions 6, by means of which the frame is pivoted to certain of the links of the chains 2, said links being provided with projections 7 extending into said trunnions. Thus the frame will be free to move with relation to the chains 2, so that it may normally retain a horizontal position. Formed on each end of the frame is a cam 8 which is located inwardly of the adjacent trunnion. These cams are adapted to coöperate with vertically adjustable cams 9 forming parts of localized trips 10, the purpose of which is to reverse the positions of the buckets to deposit the dough.

The dough containers are mounted on the frames 5 and depend therefrom. Each of these containers is constructed of transversely-extending wires 11 and longitudinally-extending wires 12, the wires being crossed, as illustrated in the drawing, to form a mesh. The transversely-extending wires 11 terminate short of the ends of the frame 5, so that the longitudinal wires 12 alone are located at the ends and the portions of these wires at these points extend substantially vertically. This particular arrangement of the wires insures the retention of the dough in the container and also the ready passage of the dough from the container when the bucket is inverted. This is because of the fact that the ends of the longitudinal wires 12 extend substantially in the line of travel of the dough in its passage from the bucket, and thus there will be no formation of "keys" which will tend to prevent such movement of the dough.

In order that the wires of the containers may be lubricated so as to prevent the sticking of the dough to the wires, and thus facilitate the movement from the containers, I have provided a lubricating device which is located within the proofing chamber 1 and comprises a reservoir 13 containing animal, mineral or vegetable fats or oils. The reservoir 13 is located in the path of travel of the buckets and in advance of the dough-receiving point, so that the fat or oils are applied to the wires immediately in advance of the reception of the dough.

In Figs. 4 and 5, I have illustrated a modified form of bucket which includes a pair of containers 14 and 15 mounted on a common frame 16, which frame is provided at its ends with trunnions 17 and arms 18 similar to those described in connection with Figs. 2 and 3, and performing the same functions. It is to be understood in this connection that the number of containers may be increased at will, and I do not wish to limit myself to a bucket which includes any particular number of containers.

A bucket constructed in accordance with the present invention has many advantages over those which have previously been used, because of the fact that the wires, while they will retain the dough pieces in the proper positions during the proofing operation, will not absorb the moisture from the dough, and, furthermore, may be very readily cleaned, and, consequently, rendered exceedingly sanitary.

Furthermore, the particular construction of the containers is advantageous in that, in addition to insuring the retention of the dough pieces in their proper positions during the proofing operation, will also insure the ready passage of the dough pieces therefrom when the buckets are reversed.

Furthermore, the containers being made of wire will not absorb the lubricant, and, consequently, the latter will be rendered effective to maintain the dough free from the wire.

What I claim is:—

1. A proofer bucket comprising a frame and a container mounted thereon and having a plurality of relatively small perforations at the dough-supporting portion thereof, and elongated openings extending from the dough-supporting portion to the frame.

2. A proofer bucket comprising a frame and a container mounted thereon, the container consisting of a series of longitudinally-extending U-shaped wires and a series of transversely-extending U-shaped wires terminating short of the ends of the frame.

3. A proofer bucket comprising a frame and a container mounted thereon, said container comprising a series of longitudinally-extending angularly bent wires and a series of transversely-extending angularly bent wires terminating short of the ends of the frame.

4. A proofer bucket comprising a frame and a container mounted thereon, said container consisting of a series of longitudinally-extending strips having horizontal and vertical portions and a series of transversely-extending strips forming a mesh with the horizontal portions of the aforementioned strips and terminating short of the vertical portions thereof.

5. A proofer bucket comprising a frame and a container mounted thereon, said container including vertical strips, only, at the ends of the frame and horizontal crossed strips between said vertical strips.

6. The combination with a conveyer including a plurality of perforated proofer buckets of moisture proof material, of means for applying a lubricant to the inside and outside of each of said buckets.

7. In a proofer bucket, a container having relatively small perforations in the dough-supporting portion thereof and having elongated openings extending from the dough-supporting portion in the direction in which the dough is deposited from the container.

Signed at Saginaw, in the county of Saginaw and State of Michigan, this 26th day of April, A. D. 1917.

GEORGE J. HICKS.